United States Patent
Niimi (10) Patent No.: US 7,418,942 B2
(45) Date of Patent: Sep. 2, 2008

(54) CONTROL APPARATUS AND CONTROL METHOD FOR INTERNAL COMBUSTION ENGINE

(75) Inventor: Kuniaki Niimi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/790,654

(22) Filed: Apr. 26, 2007

(65) Prior Publication Data
US 2007/0288153 A1   Dec. 13, 2007

Related U.S. Application Data

(62) Division of application No. 11/391,549, filed on Mar. 29, 2006, now Pat. No. 7,228,221, which is a division of application No. 10/976,769, filed on Nov. 1, 2004, now Pat. No. 7,047,940.

(30) Foreign Application Priority Data
Nov. 20, 2003   (JP)   ............................. 2003-391035

(51) Int. Cl.
F00D 1/00 (2006.01)
F02D 41/00 (2006.01)
(52) U.S. Cl. .............. 123/327; 123/339.24; 123/406.44
(58) Field of Classification Search ................ 123/327, 123/329, 434, 676, 339.11, 339.12, 339.22, 123/339.24, 393, 402, 406.44, 406.45
See application file for complete search history.

(56) References Cited

U.S. PATENT DOCUMENTS

| 5,715,796 | A | * | 2/1998 | Suzuki et al. | ................ | 123/492 |
| 5,797,369 | A | * | 8/1998 | Suzuki et al. | ................ | 123/436 |
| 5,839,415 | A | * | 11/1998 | Suzuki et al. | ................ | 123/491 |
| 5,988,137 | A | | 11/1999 | Tamura et al. | | |
| 6,237,562 | B1 | | 5/2001 | Awasaka et al. | | |
| 6,427,643 | B1 | | 8/2002 | Dixon | | |
| 6,601,384 | B2 | * | 8/2003 | Isobe et al. | ................ | 60/285 |
| 6,688,101 | B2 | * | 2/2004 | Isobe et al. | ................ | 60/277 |
| 6,711,893 | B2 | | 3/2004 | Ueda et al. | | |
| 7,047,940 | B2 | | 5/2006 | Niimi | | |
| 2002/0011240 | A1 | | 1/2002 | Kimura | | |
| 2002/0056268 | A1 | | 5/2002 | Isobe et al. | | |
| 2002/0056272 | A1 | | 5/2002 | Isobe et al. | | |
| 2005/0252198 | A1 | | 11/2005 | Okugawa et al. | | |
| 2006/0207241 | A1 | | 9/2006 | Araki et al. | | |

FOREIGN PATENT DOCUMENTS

| JP | A-63-263242 | 10/1988 |
| JP | 05-10198 | 1/1993 |

(Continued)

*Primary Examiner*—John T. Kwon
(74) *Attorney, Agent, or Firm*—Oliff & Berridge, PLC (57) ABSTRACT

A control apparatus retards ignition timing of the engine, and increases an amount of a fuel supplied to the engine based on a retard amount of the ignition timing, by calculating a maximum engine intake air amount at which an exhaust system temperature can be maintained at or below a predetermined upper limit temperature by increasing the amount of the fuel supplied to the engine without causing a misfire of the engine, and limiting an engine intake air amount to a value no greater than the maximum engine intake air amount.

2 Claims, 6 Drawing Sheets

FOREIGN PATENT DOCUMENTS

| | | |
|---|---|---|
| JP | A-2000-130232 | 5/2000 |
| JP | A-2000-179368 | 6/2000 |
| JP | A-2001-20792 | 1/2001 |
| JP | 2001-50081 | 2/2001 |
| JP | A-2003-240228 | 8/2003 |

* cited by examiner

CONTROL APPARATUS AND CONTROL METHOD FOR INTERNAL COMBUSTION ENGINE

INCORPORATION BY REFERENCE

This is a Division of application Ser. No. 11/391,549 filed Mar. 29, 2006, now U.S. Pat. No. 7,228,221 which in turn is a Division of application Ser. No. 10/976,769 filed Nov. 1, 2004 (now U.S. Pat. No. 7,047,940). The disclosure of each of these prior applications is hereby incorporated by reference herein in its entirety. The disclosure of Japanese Patent Application No. 2003-391035 filed on Nov. 20, 2003, including the specification, drawings and abstract, also is incorporated herein by reference in its entirety.

BACKGROUND OF THE INVENTION

1. Field of Invention

The invention relates to a control apparatus and control method for an internal combustion engine, and more particularly to a control apparatus and control method for an internal combustion engine in which an octane value of a fuel being used is changed.

2. Description of Related Art

In a typical gasoline engine, knocking is more likely to occur as an octane value of a fuel becomes lower. When a low-octane fuel is used in the gasoline engine, ignition timing is usually retarded compared to the ignition timing at which optimal performance can be obtained if a standard-octane fuel is used. The ignition timing is retarded by an amount based on the octane value of the low-octane fuel so as to prevent occurrence of knocking.

However, as the ignition timing is retarded, an exhaust gas temperature increases in the gasoline engine. Therefore, when the ignition timing is retarded in order to prevent occurrence of knocking as described above, the temperature of components of an exhaust system may excessively increase due to an increase in the exhaust gas temperature during high-load operation or the like, which may lead to a decrease in the effective lifetime of the components of the exhaust system.

Thus, the temperature of the exhaust system is maintained at or below a predetermined temperature (for example, an upper limit temperature at or below which reliability of the components of the exhaust system can be maintained) by increasing an amount of the fuel injected to the engine such that an air-fuel ratio is reduced (i.e., the air-fuel ratio is made rich) in an engine operating region in which the exhaust gas temperature increases.

Japanese Patent Laid-Open Publication No. 2001-50081 discloses an example of an engine in which the exhaust system temperature is controlled by increasing the fuel injection amount as described above.

In the engine disclosed in the aforementioned Japanese Patent Laid-Open Publication No. 2001-50081, since the fuel injection amount is increased based on the octane value of a fuel, in an engine operating region in which overheating of an exhaust system needs to be prevented, it is possible to increase the fuel injection amount by an appropriate amount even when the octane value of the fuel is changed. Thus, it is possible to prevent a decrease in fuel efficiency due to overheating of the exhaust system or an excessive increase in the fuel injection amount.

Meanwhile, in the engine disclosed in the Japanese Patent Laid-Open Publication No. 2001-50081, since the amount by which the fuel injection amount is increased is decided based on the octane value of the fuel, the fuel injection amount needs to be increased by a larger amount as the degree of the increase in the exhaust system temperature due to retard of the ignition timing becomes larger, when the octane value of the fuel becomes lower.

However, in the case where the fuel injection amount is increased by a larger amount in order to suppress the increase in the exhaust system temperature as the octane value of the fuel is lower, an air-fuel mixture in a combustion chamber may become excessively rich and a misfire limit may be reached. This is particularly possible in an operating state where the exhaust gas temperature becomes high and a low-octane fuel is used.

For example, a fuel supply device may supply at least two fuels having greatly different octane values, such as a high-octane gasoline having an extremely high octane value and a low-octane gasoline having an extremely low octane value, in a given proportion, and the proportion may be changed according to an engine operating condition or the like so that the octane value of the entire fuel supplied to the engine can be changed according to the engine operating condition or the like while the engine is operated. In this case, the octane value of the fuel being used varies within a large range.

Accordingly, in the case where the increase in the exhaust system temperature is suppressed by increasing the fuel injection amount during the high-load operation or the like and when the octane value is lowest, the fuel injection amount needs to be increased by a large amount, which may lead to occurrence of a misfire in a combustion chamber due to a rich air-fuel ratio.

SUMMARY OF THE INVENTION

In view of the above problems, it is one object of the invention to provide a control apparatus and control method for an internal combustion engine, which makes it possible to prevent (or at least reduces the possibility of) an excessive increase in an exhaust system temperature while preventing occurrence of a misfire due to a rich air-fuel ratio in an internal combustion engine in which ignition timing is retarded, even when a low-octane fuel is used.

According to a first aspect of the invention, a control apparatus for an internal combustion engine includes a controller that retards ignition timing of the engine, and increases an amount of a fuel supplied to the engine based on a retard amount of the ignition timing. The controller stops supply of the fuel to the engine when a value of a parameter relating to a misfire of the engine satisfies a misfire condition set based on an octane value of the fuel.

In the first aspect of the invention, the supply of the fuel to the engine is stopped when the value of a parameter relating to a misfire of the engine, such as an amount of the fuel supplied to the engine, an engine intake air amount, and ignition timing, satisfies the misfire condition. In the first aspect of the invention, for example, the supply of the fuel to the engine may be stopped when the value of the parameter has reached a limit value corresponding to the misfire condition. The limit value of the parameter corresponding to the misfire condition varies depending on the octane value of the fuel. Accordingly, in the first aspect of the invention, the controller may change the limit value of the parameter based on the octane value of the fuel. In this case, since the limit value of the parameter is changed based on the octane value of the fuel, it is possible to prevent an excessive increase in an exhaust system temperature by suppressing an increase in an exhaust gas temperature without causing a misfire even when the octane value of the fuel is changed.

According to a second aspect of the invention, a control apparatus for an internal combustion engine includes a controller that retards ignition timing of the engine, and increases an amount of a fuel supplied to the engine based on a retard amount of the ignition timing. The controller determines whether a misfire may occur in the engine if an increased amount of the fuel is supplied to the engine, and stops supply of the fuel to the engine when it is determined that a misfire may occur.

In the second aspect of the invention, in the case where an increase in an exhaust system temperature is suppressed by increasing the amount of the fuel supplied to the engine, it is determined whether a misfire may occur if the engine is supplied with the fuel of the amount required for maintaining the exhaust system temperature at or below an upper limit temperature. When it is determined that a misfire may occur, the supply of the fuel to the engine is stopped. Thus, in the case where the octane value of the fuel is low, and the amount of the fuel supplied to the engine needs to be increased by a large amount in order to suppress the increase in the exhaust system temperature, fuel cut is performed. Accordingly, it is possible to prevent overheating of the exhaust system while preventing occurrence of a misfire.

According to a third aspect of the invention, a control apparatus for an internal combustion engine includes a controller that retards ignition timing of the engine, and increases an amount of a fuel supplied to the engine based on a retard amount of the ignition timing. The controller calculates a maximum engine intake air amount at which an exhaust system temperature can be maintained at or below a predetermined upper limit temperature by increasing the amount of the fuel supplied to the engine without causing a misfire of the engine, and limits an engine intake air amount to a value no greater than the maximum engine intake air amount.

In the third aspect of the invention, the engine intake air amount is limited so as to prevent occurrence of a misfire due to an increase in the amount of the fuel supplied to the engine. The amount of the fuel supplied to the engine is increased as the engine intake air amount (engine load) is increased. Also, the degree of an increase in the exhaust system temperature due to retard of the ignition timing becomes larger as the engine intake air amount becomes larger. In order to suppress this increase in the exhaust system temperature, the amount of the fuel supplied to the engine needs to be further increased. Thus, the amount of the fuel supplied to the engine is increased by a larger amount as the engine intake air amount becomes larger. When the engine intake air amount exceeds a certain amount, the exhaust system temperature cannot be maintained at or below the predetermined upper limit temperature unless the amount of the fuel is increased beyond a point where a misfire limit is reached.

Accordingly, in the third aspect of the invention, the engine intake air amount is prevented from exceeding the maximum engine intake air amount at which the exhaust system temperature can be maintained at or below the predetermined upper limit temperature by increasing the amount of the fuel supplied to the engine without causing a misfire of the engine. Thus, it is possible to prevent overheating of the exhaust system while preventing occurrence of a misfire.

BRIEF DESCRIPTION OF THE DRAWINGS

The foregoing and further objects, features and advantages of the invention will become apparent from the following description of preferred exemplary embodiments with reference to the accompanying drawings, wherein like numerals are used to represent like elements and wherein.

DETAILED DESCRIPTION OF PREFERRED EMBODIMENTS

Figure 1:
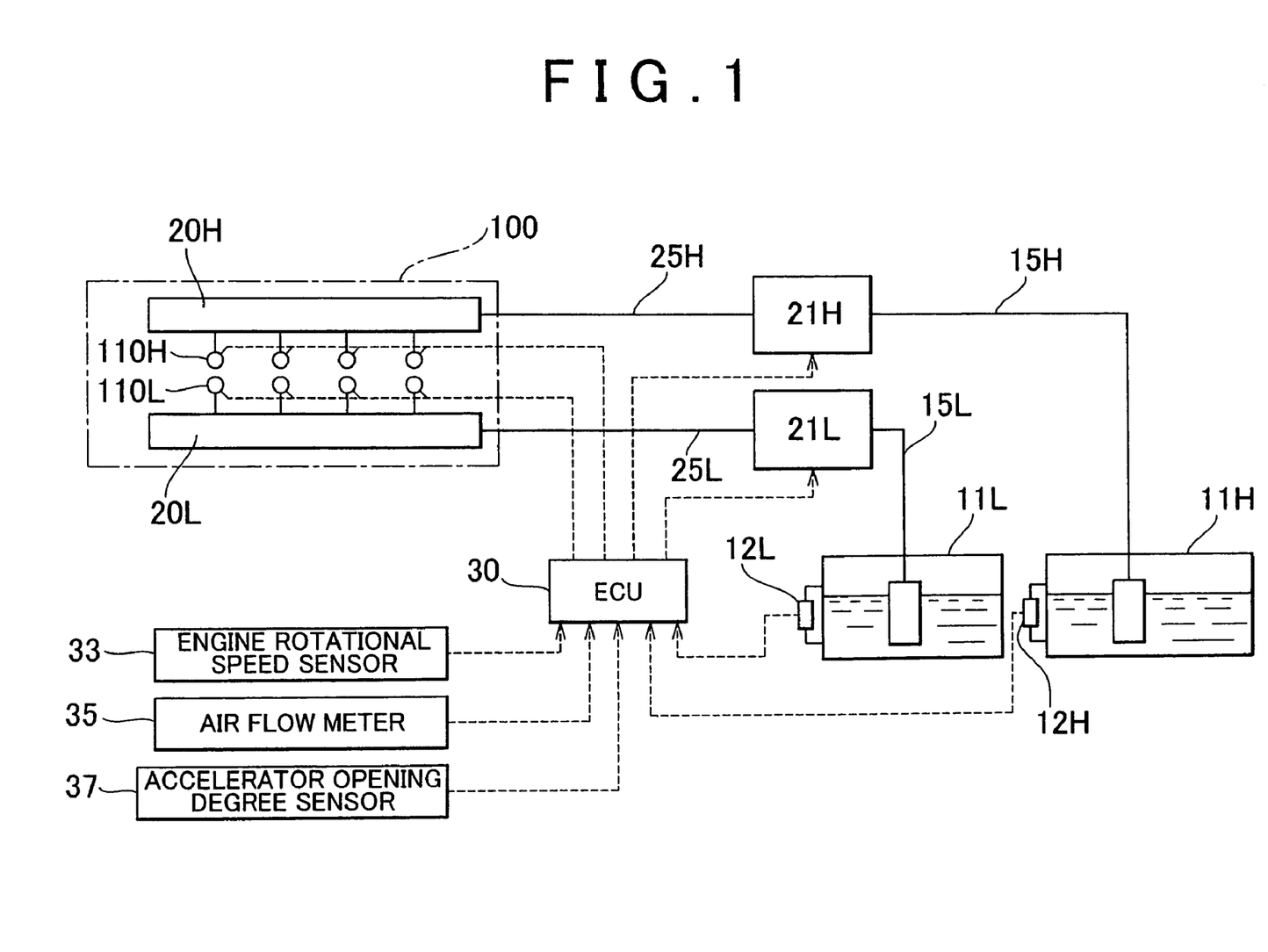
FIG. 1 is a schematic diagram showing a configuration of an embodiment of the invention applied to an internal combustion engine for an automobile.

Hereinafter, exemplary embodiments of the invention will be described with reference to the accompanying drawings. FIG. 1 is a schematic diagram showing a configuration of an internal combustion engine for a vehicle to which embodiments of the invention is applied.

In FIG. 1, fuel injection valves 110H and 110L inject a fuel into each cylinder of an internal combustion engine for a vehicle 100. In this embodiment of the invention, one fuel injection valve 110H and one fuel injection valve 110L are provided for each cylinder. Since a four-cylinder gasoline engine is used in the embodiment shown in FIG. 1, four fuel injection valves 110H and four fuel injection valves 110L are provided. That is, eight fuel injection valves are provided in total.

The fuel injection valve 110H is referred to also as "high-octane gasoline injection valve", and supplies a high-octane gasoline to each cylinder. The fuel injection valve 110L is referred to also as "low-octane gasoline injection valve", and supplies a low-octane gasoline to each cylinder. Each high-octane gasoline injection valve 110H is connected to a high-octane gasoline delivery pipe 20H. Each low-octane gasoline injection valve 110L is connected to a low-octane gasoline delivery pipe 20L. Each high-octane gasoline injection valve 110H injects the fuel in the high-octane gasoline delivery pipe 20H into its corresponding cylinder. Each low-octane gasoline injection valve 110L injects the fuel in the low-octane gasoline delivery pipe 20L into its corresponding cylinder.

In the embodiment shown in FIG. 1, a high-octane gasoline injection valve 110H and a low-octane gasoline injection valve 110L are separately provided for each cylinder. However, the high-octane gasoline delivery pipe 20H and the low-octane gasoline delivery pipe 20L may be connected to a single in-cylinder fuel injection valve. In this case, the high-octane gasoline and the low-octane gasoline may be mixed in a predetermined proportion before being supplied to the fuel injection valve, or the high-octane gasoline and the low-octane gasoline may be mixed in the predetermined proportion in the fuel injection valve after being supplied to the fuel injection valve.

Also, either the high-octane gasoline injection valve or the low-octane gasoline injection valve may be a typical port fuel injection valve provided in an intake port of each cylinder, or both of the injection valves may be typical port fuel injection valves provided in the intake port of each cylinder.

In FIG. 1, fuel tanks 11H and 11L for the engine 100 are provided. In the embodiment, since two fuels having different properties are injected into the engine from the fuel injection valves 110H and 110L, two fuel tanks for the two fuels are separately provided. Although FIG. 1 shows the case where the high-octane gasoline and the low-octane gasoline are used, a gasoline and another liquid fuel or the like may be used in the embodiment, instead of using two gasolines.

In FIG. 1, the high-octane gasoline is stored in the fuel tank 11H, and the low-octane gasoline is stored in the fuel tank 11L. The high-octane gasoline and the low-octane gasoline may be separately supplied to the fuel tanks 11H and 11L respectively, from the outside. Also, for example, the high-octane gasoline and the low-octane gasoline may be generated by separating a commercially-available gasoline into a gasoline containing a large amount of a high octane component and a gasoline containing a large amount of a low octane component using appropriate means such as a separation membrane.

The fuels stored in the fuel tanks 11H and 11L are pressurized by fuel injection pumps 21H and 21L, which may include a pumping volume control mechanism, after being supplied to the corresponding pumps 21H and 21L through pipes 15H and 15L. Thus, the fuel stored in the fuel tank 11H is supplied to the fuel injection valve 110H via a fuel supply pipe 25H, and the fuel stored in the fuel tank 11L is supplied to the fuel injection valve 110L via a fuel supply pipe 25L. Then, each of the fuels is injected from each of the fuel injection valves into a combustion chamber of each cylinder of the engine 100.

That is, in the embodiment, the high-octane gasoline and the low-octane gasoline are supplied to each cylinder via supply routes which are independent of each other. Also, the fuel injection amount of each fuel injection valve is controlled individually. Therefore, the proportion between the high-octane gasoline and the low-octane gasoline supplied to the engine can be set to any value.

In FIG. 1, an electronic control unit (hereinafter, referred to as "ECU") 30 for the engine 100 is provided. In the embodiment, the ECU 30 is configured as a microcomputer having a known configuration in which a read only memory (ROM), a random access memory (RAM), a central processing unit (CPU), and input/output ports are connected by a bi-directional bus. The ECU 30 performs a basic control of the ignition timing of each cylinder of the engine, the amount of the fuel injected into each cylinder, and the like. Also, in the embodiment, the ECU 30 sets the proportion between the high-octane gasoline and the low-octane gasoline that are supplied to the engine based on the engine load, and performs an ignition timing control for setting a retard amount of the ignition timing of the engine based on the proportion between the high-octane gasoline and the low-octane gasoline. Further, the ECU 30 performs an exhaust system temperature suppression control for increasing the fuel injection amount based on the retard amount of the ignition timing and the engine operating state so as to prevent an exhaust system temperature from exceeding a predetermined upper limit temperature due to an increase in an exhaust gas temperature as a result of retarding the ignition timing. The exhaust system temperature suppression control in the embodiment will be described in detail later.

In order to perform these controls, the output port of the ECU 30 is connected to the fuel injection valves 110H and 110L for each cylinder via a driving circuit (not shown), and the ECU 30 controls the fuel injection amount of each fuel injection valve. Also, the output port of the ECU 30 is connected to an ignition plug (not shown) for each cylinder via an ignition circuit (not shown), and the ECU 30 controls the ignition timing of the engine. The input port of the ECU 30 receives a signal indicative of a remaining amount of the high-octane gasoline in the fuel tank 11H and a signal indicative of a remaining amount of the low-octane gasoline in the fuel tank 11L from fuel remaining amount sensors 12H and 12L provided in the fuel tanks 11H and 11L, respectively. Also, the input port of the ECU 30 receives a signal indicative of an engine rotational speed of the engine 100 from an engine rotational speed sensor 33, a signal indicative of an intake air amount of the engine (hereinafter, referred to as "engine intake air amount") from an air flow meter 35 provided in an intake passage of the engine, and a signal indicative of an accelerator opening degree (a depression amount of an accelerator pedal operated by a driver) from an accelerator opening degree sensor 37 disposed in the vicinity of the accelerator pedal (not shown).

In the embodiment, the accelerator pedal is not mechanically connected to the intake passage of the engine, and an electronically controlled throttle valve (not shown), which is operated by an independent actuator, is provided. The ECU 30 performs a calculation to convert the accelerator opening degree received from the accelerator opening degree sensor 37 into a throttle valve opening degree based on a predefined relationship, and controls the electronically controlled throttle valve so that the throttle valve opening degree becomes equal to the calculated throttle valve opening degree (i.e., a target throttle valve opening degree) by driving the actuator for the throttle valve.

In the embodiment, the ECU 30 sets a total amount of the high-octane gasoline and the low-octane gasoline that are supplied to the engine, and the proportion between the high-octane gasoline and the low-octane gasoline, based on an engine load condition (for example, the engine intake air amount per one revolution of the engine, and the engine rotational speed) according to a predefined relationship. For example, the ECU 30 increases the proportion of the high-octane gasoline when the engine load is high while the engine is operated, as compared to when the engine load is low. As a result, the octane value of the entire fuel supplied to the engine is increased. Accordingly, the engine can be operated with the ignition timing being sufficiently advanced near to the ignition timing at which the maximum engine output can be obtained, and the engine output can be increased.

Meanwhile, the proportion of the low-octane gasoline is increased, for example, when the temperature of the engine is low or when the engine rotational speed is high and the engine load is low while the engine is operated. As a result, the octane value of the entire fuel is decreased and ignitionability of the fuel is improved. Accordingly, combustion is stabilized, and properties of engine exhaust gas are improved.

Further, in the case where two fuels such as the high-octane gasoline and the low-octane gasoline are supplied from separate fuel tanks as in this embodiment, it may be necessary to increase the proportion of the fuel whose remaining amount is larger in order to balance the remaining amounts of the two fuels, irrespective of the engine operating state. Therefore, the fuel having a low octane value may be supplied to the engine even during the high-load engine operation.

Meanwhile, since knocking is more likely to occur when the octane value of the fuel becomes lower, it is desirable to prevent occurrence of knocking by retarding the ignition timing of the engine based on a decrease in the octane value. However, since the timing at which the air-fuel mixture is burned in the cylinder is retarded if the ignition timing of the engine is retarded, burned gas is discharged from an exhaust valve to the outside of the cylinder before the temperature of the burned gas decreases. Therefore, the exhaust gas temperature increases as the retard amount of the ignition timing increases.

Meanwhile, durability (useful life) of components of the exhaust system decreases if the exhaust gas temperature excessively increases. Therefore, in order to protect the components of the exhaust system, it is desirable to maintain the exhaust system temperature at or below an upper limit temperature at or below which durability of the components does not decrease, by suppressing the increase in the exhaust gas temperature. Accordingly, in this embodiment, the increase in the exhaust gas temperature is suppressed by increasing the amount of the fuel supplied to the engine based on the engine operating state and the retard amount of the ignition timing so that the combustion air-fuel ratio in the engine decreases (i.e., the air-fuel ratio becomes rich). The fuel supply amount is increased by a larger amount as the retard amount of the ignition timing becomes larger, that is, the octane value of the fuel becomes lower, if other conditions remain the same.

In most cases, the exhaust system temperature can be effectively maintained at or below the upper limit temperature by increasing the fuel supply amount based on the retard amount of the ignition timing as described above. However, a problem may occur depending on the engine operating state and the octane value of the fuel. For example, in the case where the proportion of the low-octane gasoline is increased in order to adjust the balance between the remaining amounts of the high-octane gasoline and the low-octane gasoline, and therefore the octane value of the entire fuel is decreased during the high-load engine operation, a misfire may occur if the fuel supply amount is increased in order to decrease the exhaust gas temperature.

During the high-load engine operation, the air-fuel ratio is set to a slightly low value (that is, the fuel supply amount is increased), and accordingly the exhaust gas temperature is high in general. Therefore, if the octane value is decreased to a large extent during the high-load engine operation, the ignition timing is retarded by a large amount in order to prevent occurrence of knocking, and the exhaust gas temperature becomes even higher. Thus, in order to suppress such a large increase in the exhaust gas temperature by increasing the fuel supply amount, the fuel supply amount needs to be increased by a large amount. However, since the air-fuel ratio is set to a low value during the high-load engine operation, the air-fuel ratio excessively decreases (that is, the air-fuel ratio becomes excessively rich), and a misfire may occur due to a rich air-fuel ratio if the fuel supply amount is increased by a large amount.

Accordingly, in the embodiment, the increase in the exhaust system temperature is suppressed while preventing occurrence of a misfire due to a rich air-fuel ratio using the method described below.

In a first embodiment, it is determined whether a misfire may occur in the engine if the fuel supply amount is increased in order to suppress the increase in the exhaust system temperature. When it is determined that a misfire may occur, fuel cut is performed so that the exhaust system temperature is decreased without increasing the fuel supply amount.

In other words, every time the engine is operated in an engine operating region in which a misfire may occur if the fuel supply amount is increased in order to suppress the increase in the exhaust system temperature, the fuel cut is performed. As a result, the engine is prevented from being operated in the aforementioned region. Therefore, it becomes possible to maintain the exhaust system temperature at or below the upper limit temperature without causing a misfire in the engine due to a rich air-fuel ratio.

Figure 2:
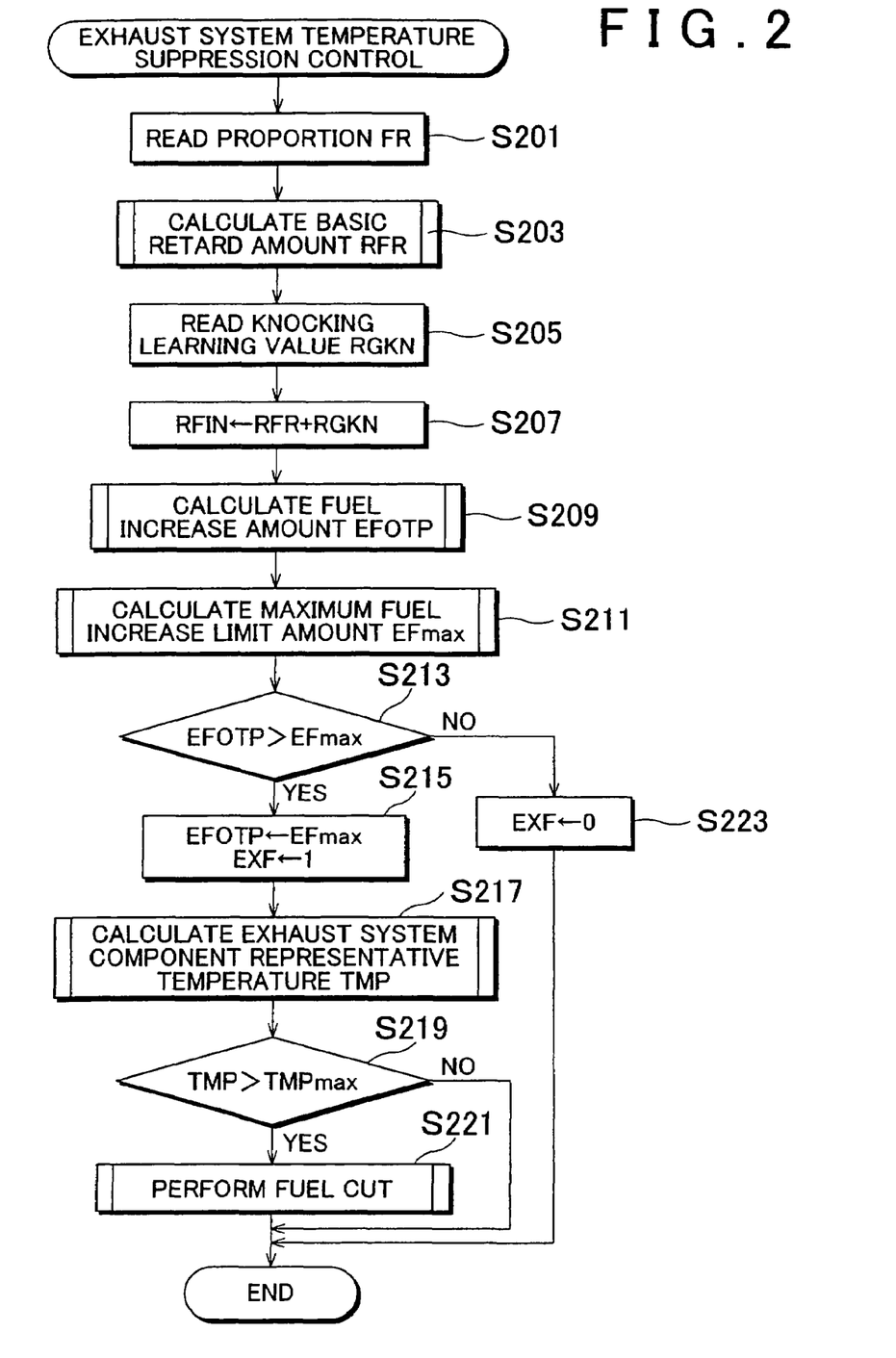
FIG. 2 is a flow chart explaining an exhaust system temperature suppression control operation according to a first exemplary embodiment of the invention.

FIG. 2 is a flow chart explaining the operation of the aforementioned control for suppressing the increase in the exhaust system temperature (referred to as "exhaust system temperature suppression control"). The control operation is performed as a routine. The routine is performed by the ECU 30 at predetermined time intervals.

After the control operation shown in FIG. 2 is started, in step S201, the ECU 30 reads a proportion FR between the high-octane fuel and the low-octane fuel in a present fuel (or the proportion of the low-octane fuel in the entire fuel). The proportion FR is set by an operation (not shown) performed by the ECU 30 separately, based on the engine load (the engine intake air amount per one revolution of the engine) and the engine rotational speed according to a predefined relationship. Alternatively, the proportion FR is set to a value required for adjusting the balance between the remaining amounts of the high-octane fuel and the low-octane fuel.

Next, in step S203, a basic retard amount RFR is calculated based on the proportion FR obtained in step S202, the engine rotational speed, and the engine load. The basic retard amount RFR is the retard amount optimal for preventing occurrence of knocking, which is decided based on a difference between a standard octane value of the fuel (a standard proportion) and a present octane value of the fuel (present proportion FR). The values of the basic retard amount RFR have been already obtained in advance through experiments using an actual engine. In the embodiment, the values of the basic retard amount RFR have been stored in the form of a three-dimensional numerical map using the engine rotational speed, the engine load, and the proportion FR as parameters. The basic retard amount RFR increases as the octane value of the fuel decreases if the engine rotational speed and the engine load remain the same.

After the basic retard amount RFR is calculated in step S203, a knocking learning value RGKN is read in step S205. The knocking learning value RGKN is a correction amount by which the basic retard amount RFR is corrected for preventing occurrence of knocking. The basic retard amount is decided according to a change in the octane value of the fuel when the engine is operated in a standard engine operating state. Therefore, the basic retard amount is the retard amount optimal for preventing occurrence of knocking and maintaining engine performance when the engine is operated in the standard engine operating state. However, for example, when the engine operating state such as the atmospheric pressure, atmospheric temperature, and humidity changes from the standard engine operating state to a different engine operating state, the optimal retard amount changes according to the change in the engine operating state.

Accordingly, the ECU 30 monitors occurrence of knocking using a knocking sensor (not shown) or the like while the engine is actually operated. The ECU 30 detects the ignition timing at which knocking actually occurs in the vicinity of the retarded ignition timing based on the basic retard amount RFR. Then, the ECU 30 stores a difference between the detected ignition timing and the retarded ignition timing based on the basic retard amount RFR, as the knocking learning value RGKN.

In step S207, a final retard amount RFIN is calculated. The final retard amount RFIN is calculated by correcting the basic retard amount RFR using the knocking learning value RGKN. That is, the final retard amount RFIN is calculated according to an equation RFIN=RFR+RGKN. The final retard amount RFIN calculated in step S207 is used as the actual retard amount of the ignition timing of the engine.

Next, in step S209, a fuel increase amount EFOTP is calculated based on the final retard amount RFIN calculated in step S207. The fuel increase amount EFOTP is the minimum amount of fuel increase, which is required for maintaining the exhaust system temperature at or below the upper limit temperature that is the maximum allowable temperature of components of the exhaust system. The values of the fuel increase amount EFOTP have been already obtained in advance through experiments or the like, and have been stored in the ROM of the ECU 30 in the form of a three-dimensional numerical map using the final retard amount RFIN, the engine rotational speed, and the engine load as parameters. In step S209, the fuel increase amount EFOTP is calculated based on the final retard amount RFIN calculated in step S207, the present engine rotational speed, and the present engine load, according to the numerical map.

In step S211 and step S213, it is determined whether a misfire will occur due to a rich air-fuel ratio if the fuel supply amount is increased by the fuel increase amount EFOTP.

That is, in step S211, a fuel supply amount above which a misfire occurs due to a rich air-fuel ratio is calculated based on a relationship that is obtained in advance through experiments, and a maximum fuel increase limit amount EFmax, which is the fuel increase amount corresponding to the fuel supply amount above which a misfire occurs is calculated. Then, in step S213, it is determined whether the fuel increase amount EFOTP calculated in step S209 exceeds the maximum fuel increase limit amount EFmax.

In step S213, when the fuel increase amount EFOTP is equal to or less than the maximum fuel increase limit amount EFmax, there is no possibility that a misfire will occur even if the fuel supply amount is increased by the fuel increase amount EFOTP. Therefore, step S215 and subsequent steps are not performed, and the value of a fuel cut announcement flag EXF is set to 0 in step S223 as described later. Then, the present routine is terminated.

Meanwhile, when the fuel increase amount EFOTP is greater than the maximum fuel increase limit amount EFmax, a misfire may occur if the fuel supply amount is increased by the fuel increase amount EFOTP. Therefore, in step S215, the fuel increase amount EFOTP is limited to the maximum fuel increase limit amount EFmax, and the value of the fuel cut announcement flag EXF is set to 1. Then, the routine proceeds to step S217.

The fuel cut announcement flag EXF indicates whether there is a large possibility that the fuel cut will be performed in a present engine operating state. When the fuel cut announcement flag is set to 1, a misfire should not occur since the fuel increase amount EFOTP is limited to the maximum fuel increase limit amount EFmax in step S215, but there is a large possibility that the fuel cut will be performed due to overheating of the exhaust system. Accordingly, in the embodiment, when the fuel cut announcement flag EXF is set to 1, a warning lamp provided for the driver is turned on to notify the driver that there is a large possibility that the fuel cut will be performed.

After the fuel cut announcement flag EXF is set to 1 in step S215, a present exhaust system component representative temperature TMP is calculated in step S217. The exhaust system component representative temperature TMP represents the temperature of the components of the exhaust system. The exhaust system component representative temperature TMP is calculated based on the present exhaust system temperature. The temperature of the components of the exhaust system increases according to the increase in the exhaust system temperature. Thus, it is considered that an exhaust system component representative temperature increase value $\Delta TMP$, which is an increase in the exhaust system component representative temperature TMP per unit time, is proportional to a difference between an exhaust system temperature EXT and the exhaust system component representative temperature TMP.

Accordingly, the present exhaust system component representative temperature TMP is obtained by an equation $TMP=\Delta TMP+TMP_{i-1}$, in which $TMP_{i-1}$ is an exhaust system component representative temperature a unit time ago. The exhaust system component representative temperature increase value $\Delta TMP$ is obtained by an equation $\Delta TMP=K \times (EXT-TMP_{i-1})$, in which K is a constant value.

The values of the exhaust system temperature EXT have been stored in advance in the ROM of the ECU 30 in the form of a numerical map using the engine rotational speed, engine load, the retard amount of the ignition timing, and the air-fuel ratio of the engine (i.e., the fuel increase amount), as parameters.

The ECU 30 starts to calculate the exhaust system temperature EXT and the exhaust system component representative temperature increase value $\Delta TMP$ using an appropriate initial value of the exhaust system component representative temperature TMP (for example, the atmospheric temperature) when the engine is started. Thus, the ECU 30 calculates the present exhaust system component representative temperature TMP by accumulating the values of $\Delta TMP$.

In step S219, it is determined whether the present exhaust system component representative temperature TMP calculated in step S217 exceeds a predetermined maximum allowable temperature TMPmax. When the present exhaust system component representative temperature TMP is higher than the predetermined maximum allowable temperature TMPmax (TMP>TMPmax), the fuel cut is performed in step S221.

That is, in the embodiment, it is determined whether the actual exhaust system component representative temperature TMP exceeds the maximum allowable temperature TMPmax due to the increase in the exhaust system temperature. That is, it is determined whether overheating of the exhaust system actually occurs, instead of simply determining whether the exhaust system temperature exceeds the upper limit temperature. The fuel cut is performed only when the overheating actually occurs. Thus, in this embodiment, the frequency with which the fuel cut is performed is reduced while reliably preventing actual overheating of the exhaust system.

In the embodiment, it is determined whether the fuel cut needs to be performed based on whether the exhaust system component representative temperature TMP exceeds the maximum allowable temperature (step S219, and step S221), as described above. However, the fuel cut may be performed immediately when the exhaust system temperature EXT, which is calculated based on the engine rotational speed, the retard amount, the air-fuel ratio, and the like, exceeds a predetermined upper limit temperature. Owing to the control operation described above, the increase in the exhaust system temperature of the engine can be suppressed while preventing occurrence of a misfire even when the ignition timing is retarded due to use of a low-octane fuel. Also, in this embodiment, the calculated fuel increase amount EFOTP is compared with the maximum fuel increase limit amount EFmax, and the fuel increase amount EFOTP is limited to the maximum fuel increase limit amount EFmax when the fuel increase amount EFOTP is greater than the maximum fuel increase limit amount EFmax (EFOTP>EFmax). However, supply of the fuel to the engine may be stopped, that is, the fuel cut may be performed when the fuel increase amount EFOTP is greater than the maximum fuel increase limit amount EFmax (EFOTP>EFmax).

Next, the operation of the exhaust system temperature suppression control according to a second embodiment will be described with reference to FIG. 3. In the second embodiment, a maximum engine intake air amount GAmax (gram per second) is calculated in advance. The maximum engine intake air amount GAmax is the upper limit value of the engine intake air amount, at or below which the exhaust system component representative temperature TMP can be maintained at or below the maximum allowable temperature TMPmax without causing a misfire. When an actual engine intake air amount GA exceeds the maximum engine intake air amount GAmax, the fuel cut is performed.

The exhaust system temperature of the engine becomes higher as the engine load becomes higher, that is, as the engine intake air amount becomes larger. Therefore, in order to maintain the exhaust system temperature at or below the upper limit temperature when the engine is operated with the ignition timing being retarded, it is desirable to decrease the exhaust system temperature by decreasing the air-fuel ratio to a larger extent as the retard amount of the ignition timing becomes larger, and as the engine intake air amount becomes larger.

Accordingly, when the retard amount of the ignition timing is decided, the air-fuel ratio required for maintaining the exhaust system temperature at or below the upper limit temperature becomes a function of the engine intake air amount. Therefore, when the retard amount of the ignition timing is decided, the maximum engine intake air amount GAmax above which the air-fuel ratio becomes equal to or less than a rich misfire limit is decided. In this embodiment, the maximum intake amount GAmax is obtained based on the retard amount of the ignition timing, and the fuel cut is performed when the actual engine intake air amount exceeds the maximum engine intake air amount. Thus, the exhaust system temperature can be maintained at or below the upper limit temperature without causing a misfire.

Figure 3:
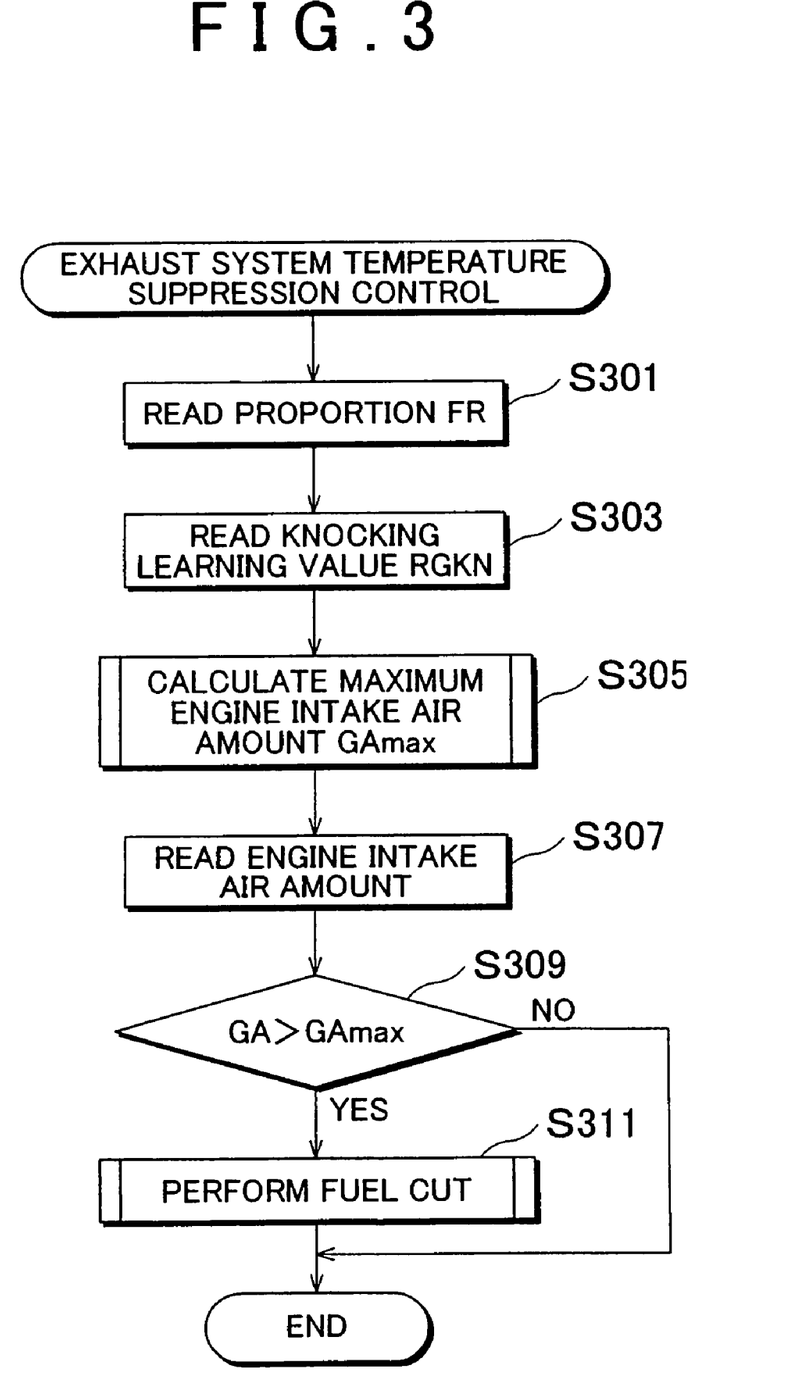
FIG. 3 is a flow chart explaining an exhaust system temperature suppression control operation according to a second exemplary embodiment of the invention.

FIG. 3 is a flow chart specifically explaining the operation of this exhaust system temperature suppression control. The control operation is performed as a routine. The routine is performed by the ECU 30 at predetermined time intervals.

After the control operation shown in FIG. 3 is started, the proportion FR is read in step S301, and the knocking learning value RGKN is read in step S303. The proportion FR and the knocking learning value RGKN are the same as those used in the control according to the first embodiment shown in FIG. 2. In the second embodiment, the maximum engine intake air amount GAmax is directly calculated using the proportion FR and the knocking learning value RGKN in step S305.

As described above, the maximum engine intake air amount GAmax is the upper limit value of the engine intake air amount, at or below which the exhaust system component representative temperature TMP can be maintained at or below the maximum allowable temperature TMPmax without causing a misfire due to a rich air-fuel ratio. The maximum engine intake air amount GAmax is a function of the retard amount of the ignition timing of the engine. That is, since the retard amount of the ignition timing is set based on the octane value, the maximum engine intake air amount GAmax (the upper limit value of the engine intake air amount above which a misfire occurs) also is changed based on the octane value.

As described above with reference to FIG. 2, the final retard amount RFIN is the sum of the basic retard amount RFR and the knocking learning value RGKN. Also, the basic retard amount RFR is decided based on the octane value of the fuel (that is, the proportion FR), and the knocking learning value RGKN is decided according to the actual engine operating state. Thus, in this embodiment, the values of the final retard amount RFIN have been calculated based on the values of the proportion FR and the values of the knocking learning value RGKN in advance. Further, the value of the maximum engine intake air amount GAmax corresponding to each value of the final retard amount RFIN has been calculated in advance, and has been stored in the ROM of the ECU 30 in the form of a two-dimensional numerical map using the proportion FR and knocking learning value RGKN as parameters. In step S305, the present maximum engine intake air amount GAmax is obtained based on the present proportion FR and the present knocking learning value RGKN, according to the numerical map.

Next, in step S307, the present engine intake air amount GA is read from the air flow meter 35. In step S309, it is determined whether the actual engine intake air amount GA exceeds the maximum engine intake air amount GAmax.

When the actual engine intake air amount GA is greater than the maximum intake air amount (GA>GAmax) in step S309, there is a possibility that a misfire may occur due to a rich air-fuel ratio. Therefore, the fuel cut is performed in step S311. Thus, in this embodiment, when the ignition timing is retarded based on the octane value of the fuel, it is possible to prevent occurrence of a misfire due to a rich air-fuel ratio while maintaining the exhaust system temperature at or below the upper limit temperature by increasing the fuel supply amount.

Figure 4:
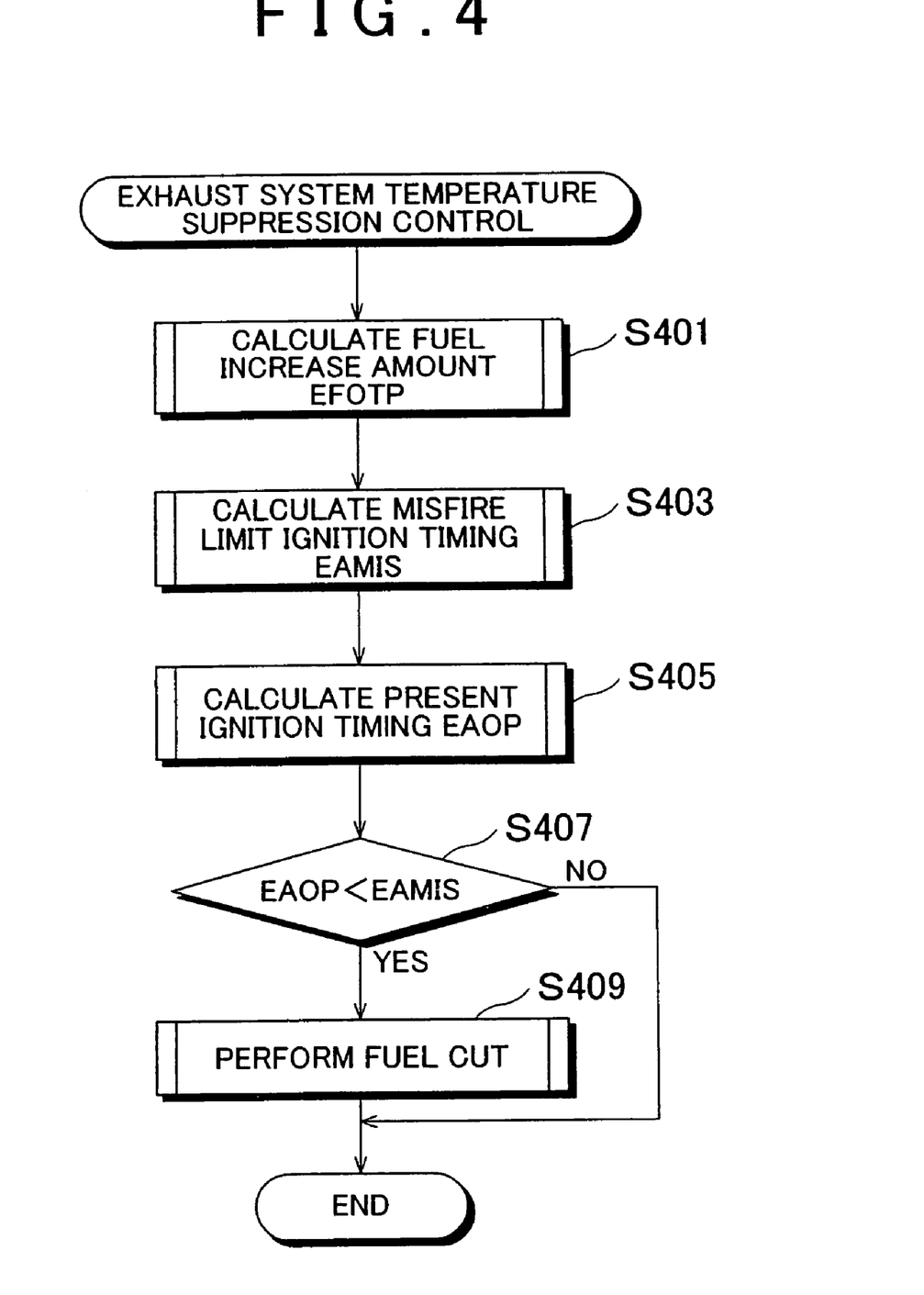
FIG. 4 is a flow chart explaining an exhaust system temperature suppression control operation according to a third exemplary embodiment of the invention.

Next, the operation of the exhaust system temperature suppression control according to a third embodiment will be described. In the third embodiment, misfire limit ignition timing EAMIS corresponding to the present fuel increase amount EFOTP is obtained. The misfire limit ignition timing EAMIS is the ignition timing after which a misfire likely occurs. When present ignition timing EAOP is later than the misfire limit ignition timing EAMIS, the fuel cut is performed.

That is, in this embodiment as well, when the fuel supply amount is increased such that the air-fuel ratio becomes richer than the air-fuel ratio at which the air-fuel mixture can be ignited at the ignition timing decided based on the present retard amount RFIN, the fuel cut is performed. FIG. 4 is a flow chart explaining the operation of the exhaust system temperature suppression control according to the third embodiment. The control operation is performed by the ECU 30 at predetermined time intervals.

In the control operation shown in FIG. 4, first, the fuel increase amount EFOTP is calculated in step S401. The fuel increase amount EFOTP is calculated by the operation (not shown) performed by the ECU 30 separately in the same manner as in the first embodiment that has been described with reference to FIG. 2.

Then, in step S403, the misfire limit ignition timing EAMIS corresponding to the present fuel increase amount EFOTP is calculated. The values of the misfire limit ignition timing EAMIS have been already obtained in advance through experiments or the like, and have been stored in the ROM of the ECU 30 in the form of a three-dimensional numerical map using the engine rotational speed, the engine load, and the fuel increase amount EFOTP, as parameters.

After the misfire limit ignition timing EAMIS is calculated in step S403, the actual ignition timing EAOP of the engine is calculated in step S405. The actual ignition timing EAOP is the ignition timing that is retarded with respect to the ignition timing that is optimal when the fuel having the standard octane value is used, by the final retard amount RFIN. The final retard amount RFIN is separately calculated in the same manner as in the control according to the first embodiment shown in FIG. 2.

Then, in step S407, the actual ignition timing EAOP is compared with the misfire limit ignition timing EAMIS. When the actual ignition timing EAOP is later than the misfire limit ignition timing EAMIS (EAOP<EAMIS), the fuel cut is performed in step S409.

Next, the operation of the exhaust system temperature suppression control according to a fourth embodiment of the invention will be described. In the aforementioned second embodiment (FIG. 3), the maximum engine intake air amount GAmax (gram per second) is calculated in advance. The maximum engine intake air amount GAmax is the upper limit value of the engine intake air amount, at or below which the exhaust system component representative temperature TMP can be maintained at or below the maximum allowable temperature TMPmax without causing a misfire when the engine is operated with the ignition timing being retarded by the present retard amount. When the actual engine intake air amount GA exceeds the maximum engine intake air amount GAmax, the fuel cut is performed so as to prevent occurrence of a misfire.

Figure 5:
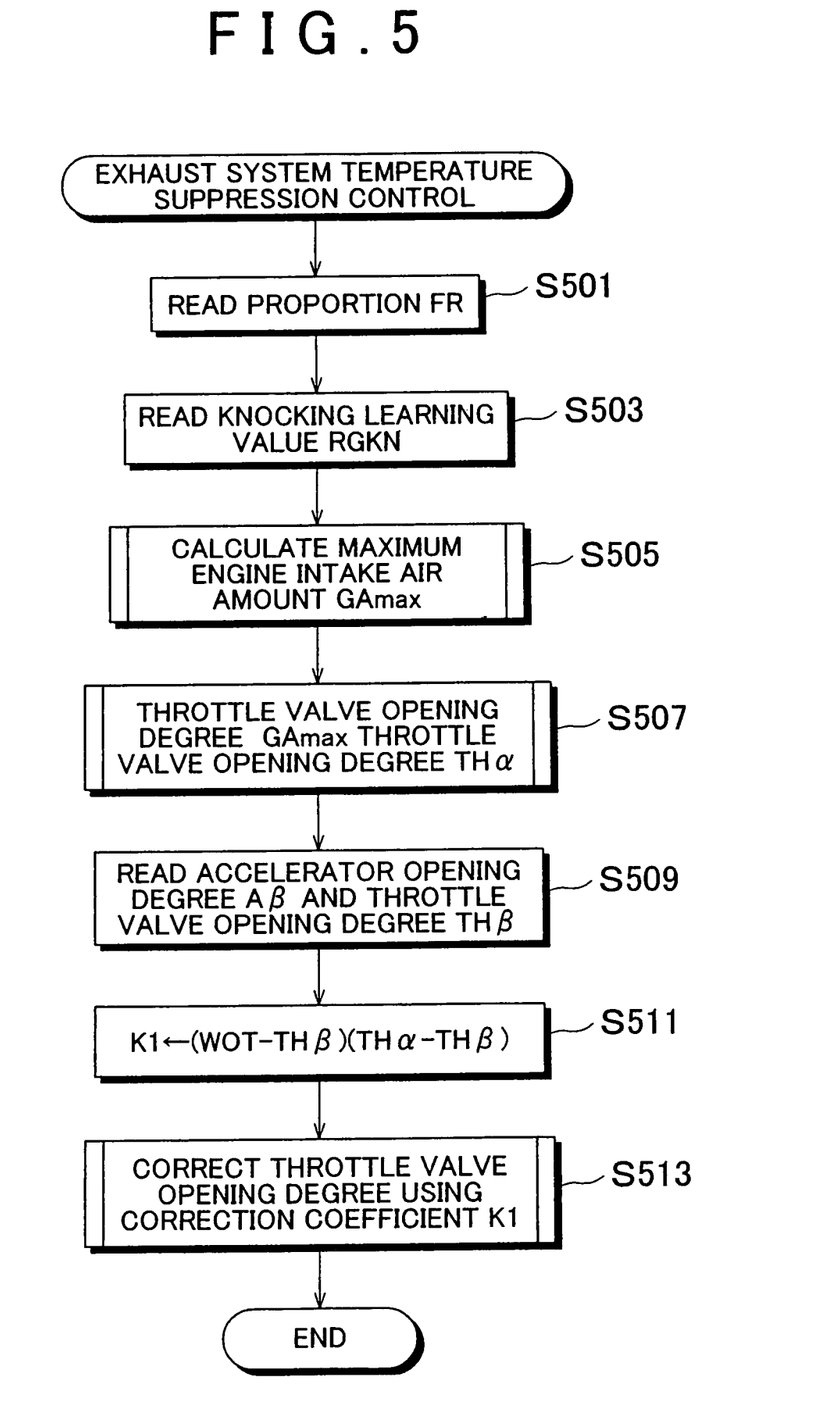
FIG. 5 is a flow chart explaining an exhaust system temperature suppression control operation according to a fourth exemplary embodiment of the invention.

In the fourth embodiment as well, the operation of the exhaust system temperature suppression control is performed based on the calculated maximum engine intake air amount GAmax. However, in the fourth embodiment, the actual engine intake air amount GA is limited to the maximum engine intake air amount GAmax or less without performing the fuel cut, unlike the aforementioned second embodiment in which the actual intake air amount GA is limited to the maximum engine intake air amount GAmax or less by performing the fuel cut when the actual engine intake air amount GA exceeds the maximum engine intake air amount GAmax.

For example, the engine 100 in this embodiment (shown in FIG. 1) includes the electronically controlled throttle valve whose opening degree can be set independently of the operation of accelerator pedal performed by the driver. Since the electronically controlled throttle valve is used in this embodiment, the opening degree of the throttle valve can be set freely. The electronically controlled throttle valve is usually controlled such that a throttle valve opening degree THA is proportional to an accelerator opening degree ACCP. However, in this embodiment, after the maximum engine intake air amount GAmax is calculated, a calculation is performed to obtain the throttle valve opening degree at which the engine intake air amount becomes equal to the maximum engine intake air amount GAmax in the present engine operating state (i.e., the present intake air temperature and the present engine rotational speed). Then, the relationship between the accelerator opening degree ACCP and the throttle valve opening degree THA is corrected such that the throttle valve opening degree when the accelerator opening degree is 100% becomes equal to the throttle valve opening degree at which the engine intake air amount becomes equal to the maximum engine intake air amount.

Thus, the actual engine intake air amount GA is limited to the maximum engine intake air amount GAmax or less, and occurrence of a misfire due to a rich air-fuel ratio is prevented without performing the fuel cut.

FIG. 5 is a flow chart specifically explaining the operation of the exhaust system temperature suppression control according to the aforementioned fourth embodiment. The control operation is performed by the ECU 30 at predetermined time intervals.

In the control operation shown in FIG. 5, first, the proportion FR is read in step S501, and the knocking learning value RGKN is read in step S503. In step S505, the maximum engine intake air amount GAmax is calculated based on the proportion FR and the knocking learning value RGKN.

As described above, the maximum engine intake air amount GAmax is the upper limit value of the engine intake air amount, at or below which the exhaust system component representative temperature TMP can be maintained at or below the maximum allowable temperature TMPmax without causing a misfire due to a rich air-fuel ratio. The operation for calculating the maximum engine intake air amount GAmax in step S501 to step S505 in FIG. 5 is the same as the operation in step S301 to step S305 in FIG. 3.

Thus, after the maximum engine intake air amount GAmax is calculated, the throttle valve opening degree TH$\alpha$ at which the engine intake air amount becomes equal to the maximum engine intake air amount GAmax is calculated, based on the present engine operating state in step S507. The engine intake air amount is decided based on the engine rotational speed and the throttle valve opening degree when the conditions such as the atmospheric temperature and the atmospheric pressure remain the same. In the embodiment, the relationship between the engine intake air amount and the throttle valve opening at each engine rotational speed is obtained when the atmospheric temperature, the atmospheric pressure, and the like are in the standard state. The values of the throttle valve opening degree have been stored in the ROM of the ECU 30 in the form of a two-dimensional numerical map using the engine rotational speed and the engine intake air amount as parameters.

In step S507, the throttle valve opening degree TH$\alpha$ at which the engine intake air amount becomes equal to the maximum engine intake air amount GAmax at the present engine rotational speed is calculated by correcting the numerical map using the present intake air temperature and the present atmospheric pressure. After the throttle valve opening degree TH$\alpha$ is calculated in step S507, a present accelerator opening degree A$\beta$ is read from the accelerator opening degree sensor 37, and a present throttle valve opening degree TH$\beta$ is read from a throttle valve opening degree sensor (not shown) disposed in the vicinity of the throttle valve of the engine in step S509.

In step S511, a throttle valve opening degree correction coefficient K1 is calculated according to an equation, K1= (WOT-TH$\beta$)/(TH$\alpha$-TH$\beta$), in which WOT is the throttle valve opening degree when the throttle valve is fully open (i.e., opening degree of 100%).

Then, in step S513, the throttle valve opening degree is corrected to the target throttle valve opening degree that is set using the throttle valve opening degree correction coefficient K1.

Figure 6:
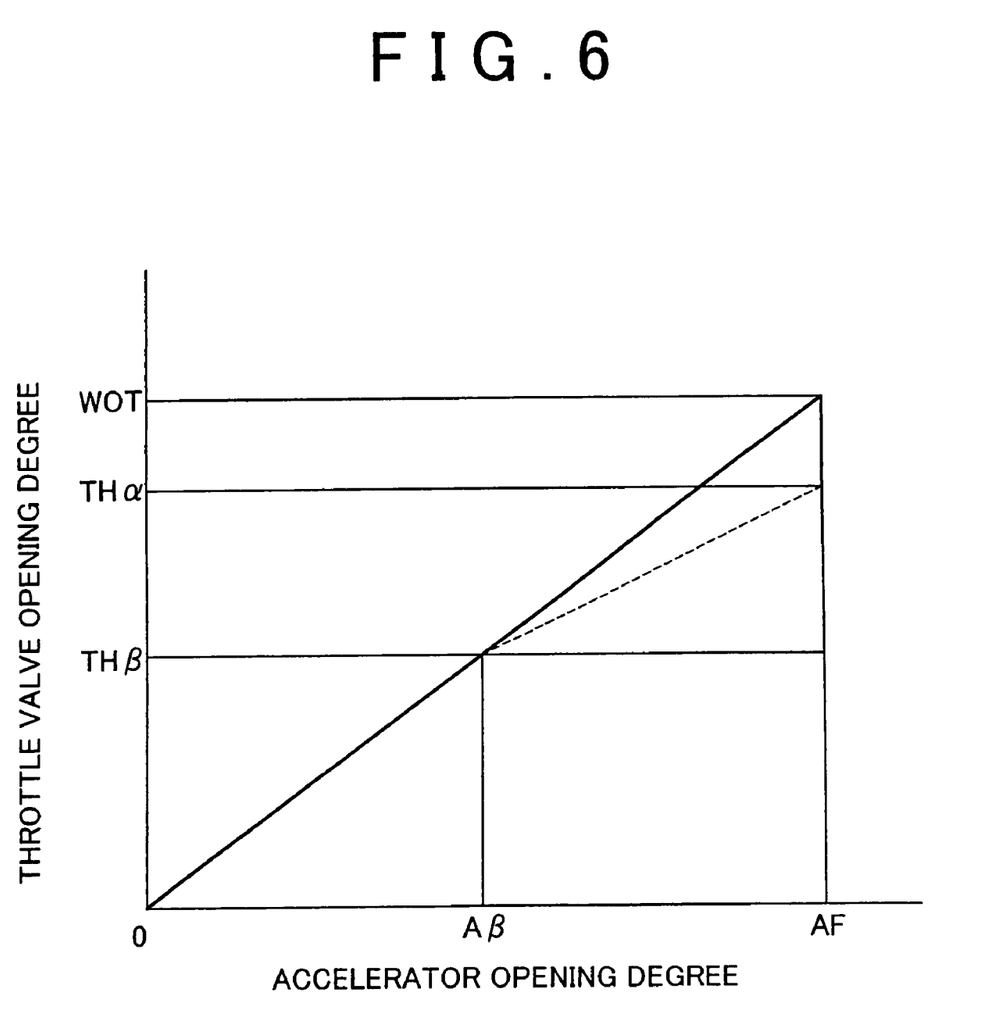
FIG. 6 is a graph explaining a relationship between an accelerator opening degree and a throttle valve opening degree.

FIG. 6 is a graph explaining the correction of the throttle valve opening degree using the throttle valve opening degree correction coefficient K1, which is performed in step S513. In FIG. 6, a horizontal axis indicates the accelerator opening degree ACCP, and a vertical axis indicates the throttle valve opening degree THA. Also, on the vertical axis, WOT indicates the throttle valve opening degree when the throttle valve is fully open, TH$\alpha$ indicates the throttle valve opening degree corresponding to the maximum engine intake air amount GAmax, and TH$\beta$ indicates the present throttle valve opening degree. On the horizontal axis, AF indicates the accelerator opening degree when the accelerator pedal is fully depressed, and A$\beta$ indicates the present accelerator opening degree corresponding to the throttle valve opening degree TH$\beta$.

The ECU 30 usually sets the relationship between the throttle valve opening degree THA and the accelerator opening degree ACCP such that the throttle valve opening degree THA is proportional to the accelerator opening degree ACCP, as shown by a solid line in FIG. 6. That is, the throttle valve opening degree THA is usually calculated according to an equation THA=ACCP×(WOT/AF).

Meanwhile, in this embodiment, when the correction of the throttle valve opening degree is performed using the throttle valve opening degree correction coefficient K1, the throttle valve opening degree THA is set using the present throttle valve opening degree THβ, the present accelerator opening degree Aβ, and the throttle valve opening degree correction coefficient K1, according to an equation, THA=THβ+(ACCP−Aβ)×(WOT/AF)×K1.

Thus, after the throttle valve opening degree correction coefficient K1 is calculated, the throttle valve opening degree is corrected to the target throttle valve opening degree that is set based on the relationship between the accelerator opening degree ACCP and the throttle valve opening degree THA shown by a dashed line. Thus, the throttle valve opening degree corresponding to the accelerator opening degree AF (i.e., the accelerator opening degree when the accelerator pedal is fully depressed) is changed to the throttle valve opening degree THα. Accordingly, since the maximum throttle valve opening degree is limited to the throttle valve opening degree THα, the engine intake air amount GA is maintained at or below the maximum engine intake air amount GAmax.

In this embodiment, the maximum engine intake air amount is limited using the electronically controlled throttle valve. However, the same operation as in this embodiment can be performed in a typical throttle valve that is connected to the accelerator pedal using a mechanical link mechanism, by providing a movable stopper for limiting the maximum throttle valve opening degree, and moving the position of the stopper according to the maximum engine intake air amount GAmax.

In the aforementioned embodiments, when the retard amount of the ignition timing is set, the octane value of the entire fuel is calculated based on the proportion between the two fuels. Thus, even in the case where the octane value of the entire fuel is changed with relatively high frequency, the exhaust system temperature suppression control can be performed easily and promptly. However, another method for detecting the octane value of the fuel during the engine operation may be employed. For example, the ignition timing at which knocking occurs may be determined while the ignition timing is gradually advanced during the engine operation, and the octane value of the fuel may be estimated based on the ignition timing at which knocking occurs and the engine operating state according to a predefined relationship.

The controller (e.g., the ECU 30) of the illustrated exemplary embodiments is implemented as a programmed general purpose computer. It will be appreciated by those skilled in the art that the controller can be implemented using one or more special purpose integrated circuits (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using one or more suitably programmed general purpose computers, e.g., microprocessor, microcontroller or other processor devices (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to exemplary embodiments thereof, it is to be understood that the invention is not limited to the exemplary embodiments and constructions. The invention is intended to cover various modifications and equivalent arrangements. In addition, while the various elements of the exemplary embodiments are shown in various combinations and configurations, which are exemplary, other combinations and configuration, including more, less or only a single element, are also within the spirit and scope of the invention.

What is claimed is:

1. A control apparatus for an internal combustion engine, comprising:
   a controller that retards ignition timing of the engine, and increases an amount of a fuel supplied to the engine based on a retard amount of the ignition timing, wherein the controller calculates a maximum engine intake air amount at which an exhaust system temperature is able to be maintained at or below a predetermined upper limit temperature by increasing the amount of the fuel supplied to the engine without causing a misfire of the engine, and limits an engine intake air amount to a value no greater than the maximum engine intake air amount.

2. A control method for an internal combustion engine, comprising the steps of:
   retarding ignition timing of the engine;
   increasing an amount of a fuel supplied to the engine based on a retard amount of the ignition timing;
   calculating a maximum engine intake air amount at which an exhaust system temperature is able to be maintained at or below a predetermined upper limit temperature by increasing the amount of the fuel supplied to the engine without causing a misfire of the engine; and
   limiting an engine intake air amount to a value no greater than the maximum engine intake air amount.

* * * * *